United States Patent [19]

Lee

[11] Patent Number: 5,592,873
[45] Date of Patent: Jan. 14, 1997

[54] JUICE EXTRACTOR

[75] Inventor: Mun-Hyon Lee, Arcadia, Calif.

[73] Assignee: Angel Life Co., Ltd., Los Angeles, Calif.

[21] Appl. No.: 565,668

[22] Filed: Dec. 1, 1995

[51] Int. Cl.⁶ .................. A23N 1/00; A23N 1/02; A23L 1/212; A23L 2/06
[52] U.S. Cl. ................. 99/510; 99/495; 99/513; 366/84; 366/90; 366/307; 366/324
[58] Field of Search ............... 99/495, 509–513, 99/348; 100/37, 53, 98 R, 117, 145, 121; 241/92, 101.1, 101.2, 260.1, 261; 366/83–85, 90, 272, 301–307, 318, 319, 322–324, 299–300, 297

[56] References Cited

U.S. PATENT DOCUMENTS

| | | | |
|---|---|---|---|
| 2,377,069 | 5/1945 | Brubaker | 366/303 X |
| 2,960,318 | 11/1960 | Caillaud | 366/303 X |
| 4,363,265 | 12/1982 | Tanioka et al. | 100/117 X |
| 4,385,553 | 5/1983 | Ihara et al. | 366/319 X |
| 4,643,085 | 2/1987 | Bertocchi | 241/260.1 X |
| 4,846,054 | 7/1989 | Mange et al. | 366/84 X |
| 4,960,328 | 10/1990 | Schumacher et al. | 366/307 X |
| 4,976,547 | 12/1990 | Hisanaga et al. | 366/307 X |
| 5,156,872 | 10/1992 | Lee | 99/510 |
| 5,221,055 | 6/1993 | Kuan | 241/199.12 |
| 5,381,730 | 1/1995 | Kim | 99/495 X |
| 5,396,836 | 3/1995 | Kim | 99/510 |
| 5,452,650 | 9/1995 | Lee | 99/510 |

*Primary Examiner*—Timothy F. Simone
*Attorney, Agent, or Firm*—Koda and Androlia

[57] ABSTRACT

A juice extractor comprising a grinding chamber provided with a pair of helical gears for crushing juice material and a compression chamber disposed beneath and communicated with the grinding chamber and provided with a pair of rotating spiral screws. The spiral ridges of the spiral screws have cut-outs which engage with annular ribs formed on the interior surface of the compression chamber so that the residue produced by the helical gears of the grinding chamber is pressed against the annular ribs by the curved surfaces of the spiral ridges of the rotating spiral screws, thus further squeezing out juice from the residue.

13 Claims, 9 Drawing Sheets

JUICE EXTRACTOR

BACKGROUND OF THE INVENTION

1. Field of the Invention

The present invention relates to a juice extractor or a juicer and more particularly to an improvement in a juicer which is used mainly at home and at restaurants.

2. Prior Art

A juice extractor or a juicer is a device for extracting juice from foodstuffs such as vegetables, tubers, and fruits. Presently juicers come in basically two types: a centrifuge type juicer and a squeezing-type juicer.

A typical centrifuge type juicer includes an upright work container with a rotatable cutter at the bottom. This type of juicer is most suitable for extracting juice from fruits. When making juice from foodstuffs such as vegetables and tubers which contain a large amount of fiber and a low water content with such a juicer, the rate of juice extraction is not very high even when the blades are rotated at a considerably high speed. Thus, the problem involved in this type of juicer is that the residue still contains some liquid therein.

On the other hand, the squeezing-type juicer is most suitable for processing hard foodstuffs such as vegetables and fibers. These foodstuffs are compressed or sliced and then compressed so that juice is extracted from the foodstuffs. This type of juicer typically uses a pair of helical gears which are meshed with each other so that the foodstuff put between the gears are crushed and squeezed so that juice is extracted.

These juicers are disclosed in, for example, U.S. Pat. Nos. 4,4440,074, 5,156,872 and 5,381,730. In these types of juicers, the juice extraction ratio is several times higher than that of centrifugation-type juicers, and these types of juicers have the advantage of preventing residual heavy metals from flowing out together with the juice.

FIG. 11 shows one of the squeezing-type juicers invented by the inventor of the present patent application. A patent application for this juicer was filed in the U.S. Patent Office on Dec. 23, 1994, and a patent was issued on Sep. 26, 1995 under U.S. Pat. No. 5,452,650.

This juicer uses a pair of helical gears 1 and a pair of Archimedes' screws 2. The foodstuff squeezed by the helical gears 1 is transferred to the Archimedes' screws 2 so that juice and residues are guided by the Archimedes' screws 2. The juice is discharged from the juicer through the screen 3, and the residues are fed out through the residue outlet 5.

However, with any of the prior art juicers as listed and described above, a complete or a substantially complete extraction of juice from the foodstuff cannot be accomplished. In other words, the residues produced by the juice-extraction process still contain some amount of liquid therein. Thus, discarding such a residue is a waste of foodstuff that should be avoided.

SUMMARY OF THE INVENTION

Accordingly, the primary object of the present invention is to provide an improved squeezing-type juicer which can completely extract juice out of any kind of foodstuff.

It is another object of the present invention to provide a juicer which is able to produce a juice that contains no residual pulp.

The above and other objects of the present invention is accomplished by a unique structure for a juice extractor which includes a grinding chamber provided therein with a pair of helical gears, a compression chamber disposed beneath and communicated with the grinding chamber and provided therein with a pair of spiral screws, and a hopper provided on the grinding chamber for guiding juice materials into the grinding chamber, and the unique structure of the present invention is that the compression chamber is provided therein with a plurality of squeezing ribs so that the residues formed by the helical gears are pressed against the squeezing ribs by the spiral screws, thus further squeezing out juice from the residues by the ribs and the spiral screws which are provided in the compression chamber.

Furthermore, the objects of the present invention are accomplished by another unique structure for a juice extractor wherein an end portion of the grinding chamber is provided with a squeezing plate so that residues are pressed between the end surface of the helical gears and the squeezing plate, thus producing juice from the residue before it is forwarded to the compression chamber.

In addition, the objects of the present invention are accomplished by still another unique structure for a juice extractor wherein the end portions of the helical gears are provided with spirals so that the residues and the juice are smoothly transferred to the compression chamber.

Still further, the objects of the present invention are accomplished by another unique structure for a juice extractor wherein the hopper has two material passages and a rotary chopper is provided beneath one of the two material passages so that hard foodstuffs are first chopped by the chopper and then crushed and squeezed by the helical gears.

Additionally, the juice extractor of the present invention may include a fine mesh screen detachably mounted to a juice outlet formed in the compression chamber, thus facilitating cleaning of the strainer screen and inside of the compression chamber as well as producing an even clearer juice.

With the structure above, the foodstuff is first crushed by the helical gears, and hard foodstuff is cut into pieces by the rotating chopper before being crushed. The thus crushed foodstuff extracts juice, and the juice is moved forward by the rotating helical gears along with the residue from which the juice has been extracted. The residue is forced so as to be pressed against the surfaces of the squeezing plate, and juice is further extracted from the residue; and after this the residue is guided to the compression chamber by the spirals formed at the ends of the helical gears. Inside the compression chamber, the residue is further pressed against the plurality of squeezing ribs by the spiral screws, and juice is extracted from the residue.

As seen from the above, the foodstuff is not only crushed by the helical gears but also pressed against squeezing plates and squeezing ribs. Accordingly, all of the liquid substance can be extracted out from the foodstuff, thus providing juice with no residual pulp therein without wasting any foodstuffs.

DETAILED DESCRIPTION OF THE PREFERRED EMBODIMENTS

One embodiment of the present invention will be described below with reference to the accompanying drawings.

Figure 1:
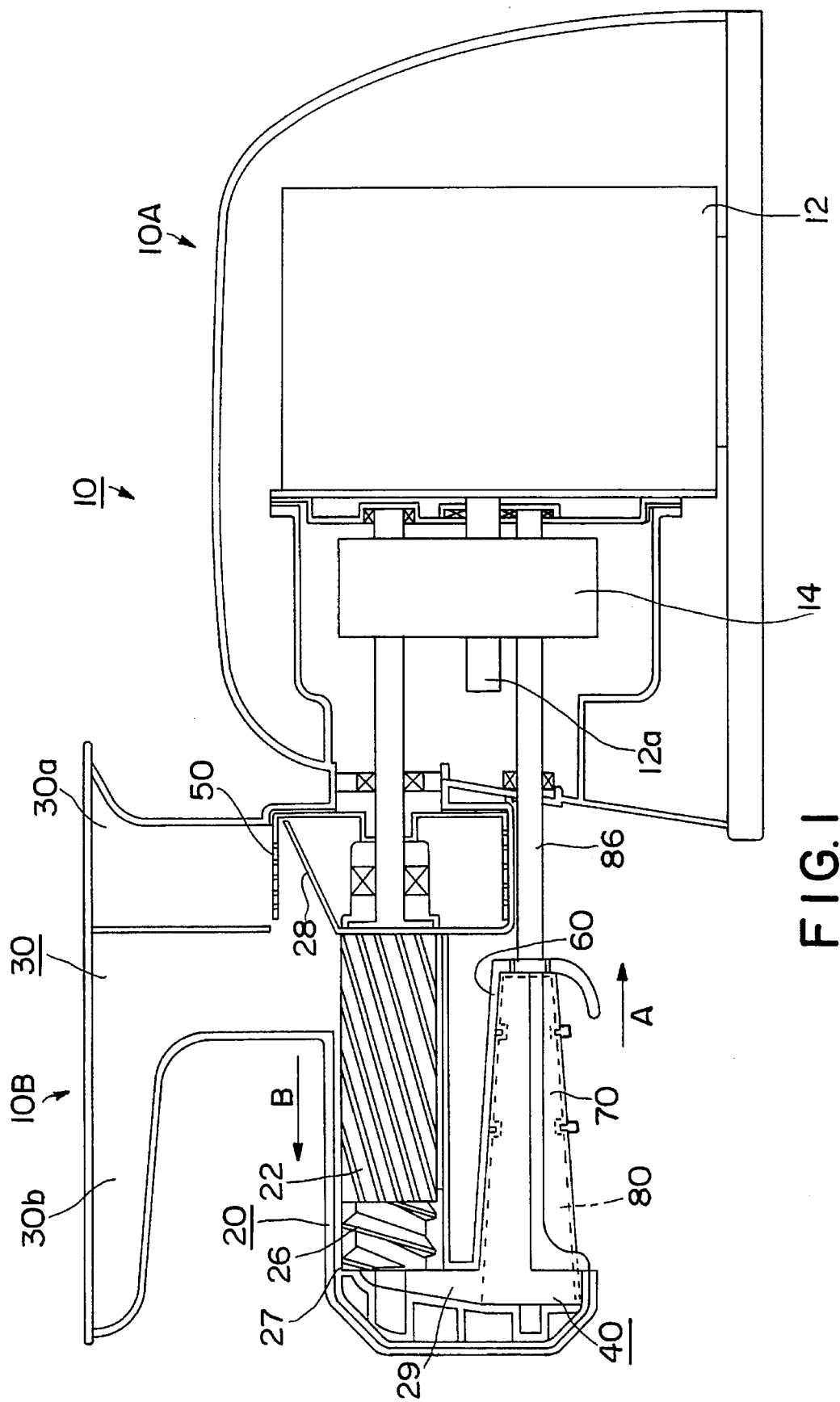
FIG. 1 is a schematic sectional view of the juice extractor according to the present invention.

In FIG. 1, the juice extractor is generally referred to by the reference numeral 10, and it substantially comprises a driving section 10A and a juice extraction section 10B which are made of plastic.

Provided inside the driving section 10A is a driving motor 12. The output shaft 12a of the driving motor 12 is connected to transmission gears which are generally referred to by the reference numeral 14 and provided inside the driving section 10A. Though a detailed description is omitted, the driving rotational force of the motor 12 is transmitted to the rotational components disposed inside the juice extraction section 10B via the transmission gears 14 that include reduction gears, etc.

The juice extraction section 10B is composed of a grinding chamber 20, a hopper 30 provided at one end (or at a root end) of the grinding chamber 20, and a compression chamber 40 provided under the grinding chamber 20. The grinding chamber 20 and the compression chamber 40 are, respectively, substantially a horizontally oriented cylindrical body, and these chambers communicate with each other by a transfer passage 29. In other words, the forward end, which is the left end in FIG. 1, of the grinding chamber 20 is opened into a root end, which is the left end in FIG. 1, of the compression chamber 40 via the transfer passage 29.

Figure 2:
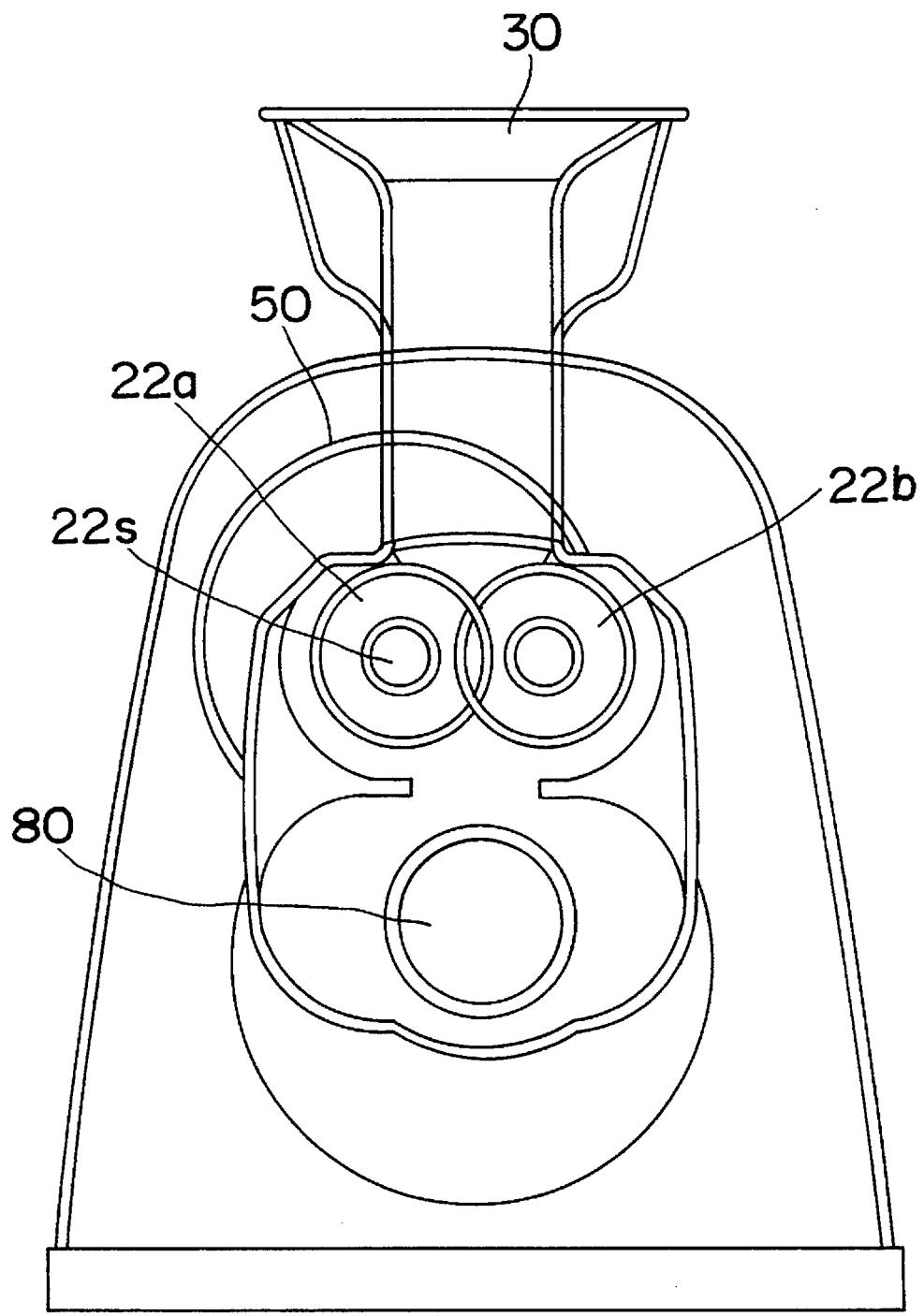
FIG. 2 is a schematic right side view thereof particularly showing the vertical relationship of the main components of the juice extractor.
Figure 3:
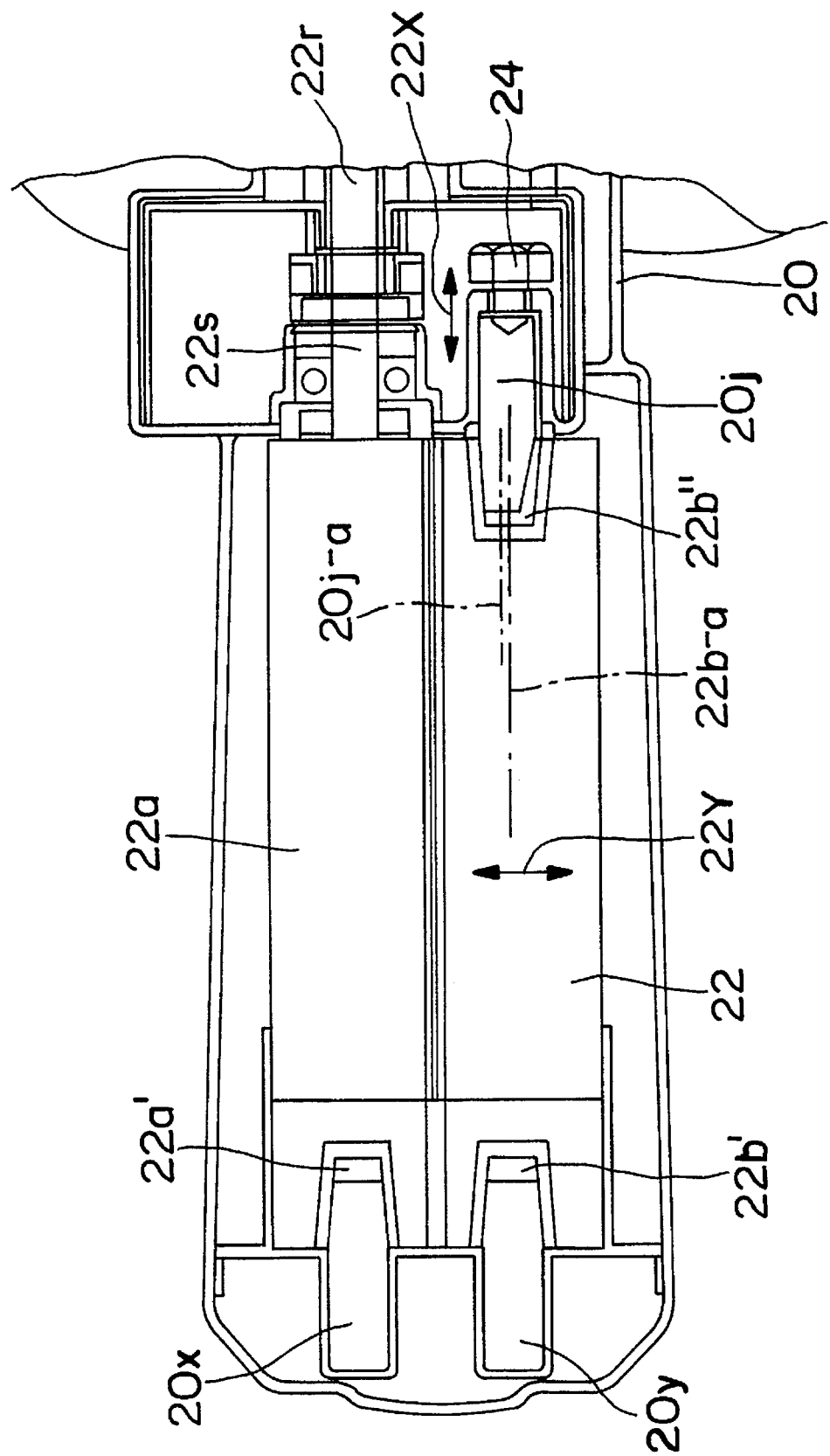
FIG. 3 is a schematic top view showing the inside of the crushing chamber of the juice extractor.

Inside the grinding chamber 20 is provided a pair of helical gears 22. The helical gears 22 are, as seen from FIGS. 2 and 3, disposed side by side and meshed with each other. In these FIGS. 2 and 3, one helical gear is referred to by the reference numeral 22a and the other by reference numeral 22b. The center shaft 22s of the helical gear 22a is connected to a rotary shaft 22r which is connected to the driving motor 12 via the transmission gears 14. Accordingly, when the helical gear 22a is rotated by the output shaft 12a of the motor 12, the other helical gear 22b that is meshed with the gear 22a is rotated so that, as described below, the foodstuffs are crushed between the two helical gears. The other end of the helical gear 22a is provided with a taper-shaped coupling hole 22a' so that the coupling hole 22a' is engaged with a first taper-shaped supporting shaft 20x provided inside the forward end of the grinding chamber 20. The helical gear 22a is thus rotatable inside the grinding chamber 20.

On the other hand, the helical gear 22b is provided at one end thereof with a first taper-shaped coupling hole 22b' so that the coupling hole 22b' is engaged with a second taper-shaped supporting shaft 20y of the grinding chamber 20.

The other end of the helical gear 22b is provided with a second taper-shaped coupling hole 22b". The second coupling hole 22b" of the helical gear 22b is coupled with an adjustment piece 20j which is, as seen from FIG. 3, of a tapered shape having a smaller diameter than that of the taper-shaped second coupling hole 22b" of the helical gear 22b. The adjustment piece 20j is attached to an adjustment screw 24 which is screwed to the wall of the grinding chamber 20, and the central axis 20j-a of the adjustment piece 20j is offset from the central axis 22b-a of the helical gear 22b.

Accordingly, when the adjustment screw 24 is turned by hand so as to move the adjustment piece 20j back and force horizontally in the direction shown by arrow 22X, the depth of the contact area between the outer tapered surface of the adjustment piece 20j and the inner tapered surface of the tapered second coupling hole 22b" of the gear 22b is changed; as a result, the helical gear 22b is in a position that it can be moved sideways or in the direction 22Y so that the depth of the engagement between the helical gears 22b and 22a can be changed. Thus, when the food stuff is guided into between the two helical gears 22a and 22b, the helical gear 22b is pushed sideways slightly (or moved away from the helical gear 22a) by the food stuff immediately before crushing is started so that a meshing relationship between the two helical gears 22a and 22b which is appropriate for crushing the guided food stuff is obtained. In other words, the depth of meshing of the helical gears 22a and 22b can be finely adjusted by the adjustment piece 20j so as to meet the differences in the size and hardness of the foodstuffs that are to be crushed by the helical gears.

Furthermore, each of the helical gears 22 is provided with spiral 26 at the forward end, and the grinding chamber 20 is provided at the inside forward end with squeezing plates 27. The squeezing plates 27 project downwardly so that the spirals 26 come into contact with the squeezing plates 27.

The hopper 30 is provided at the root end, which is the right end in FIG. 1, of the grinding chamber 20. The bottom of the hopper 30 opens into the grinding chamber 20 so that foodstuff brought into the hopper 30 drops onto the meshed and rotating helical gears 22a and 22b.

The hopper 30 has two material passages: a first passage 30a, which is for hard foodstuffs such as carrots and beats, and a second passage 30b, which is for soft foodstuffs such as spinach and cabbage. The two passages 30a and 30b communicate with each other near the bottom of the hopper 30. The grinding chamber 20 is provided with a guide plate 28 which is located at the bottom of the first passage 30a. The guide plate 28 is inclined so that the upper surface of the guide plate 28 faces the second passage 30b which communicates with the first passage 30a.

Figure 4A:
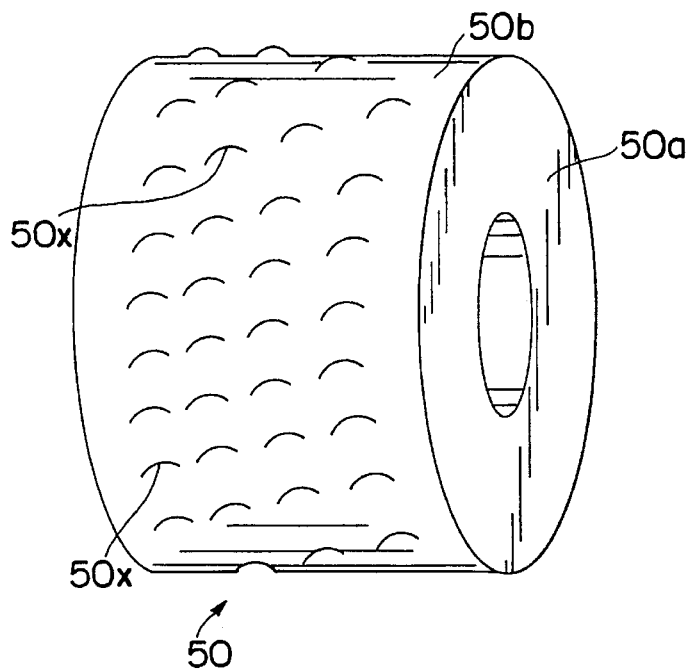
FIG. 4a shows a rotary chopper used in the juice extractor of FIG. 1.

Furthermore, inside the grinding chamber 20 and underneath the second passage 30a of the hopper 30, a rotary chopper 50 is provided. This rotary chopper 50 is rotated by the driving motor 12. FIG. 4a shows an overall view of the rotary chopper 50 used in this embodiment, and FIG. 4b shows the cross section.

Figure 4B:
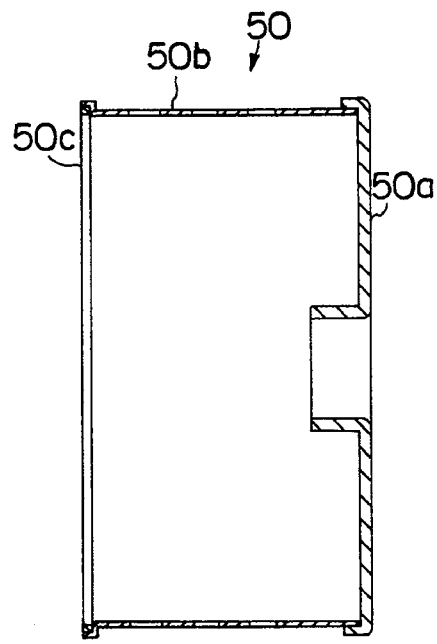
FIG. 4b is a sectional view thereof and FIG. 4c shows an enlarged sectional view of a cutter of the rotary chopper.

As seen from FIGS. 4a and 4b, the rotary chopper 50 is a hollow cylindrical body and is comprised of a main disk 50a, a cylindrically looped body 50b attached at one end thereof to the main disk 50a, and an end ring 50c attached to another end of the looped body 50b. The rotary chopper 50 is mounted on the shaft 22x that connects the motor 12 and the helical gear 22a; thus, the rotary chopper 50 is rotated together with the helical gear 22a. In addition, the rotary chopper 50 is disposed so that the axis thereof is parallel to the axis of the helical gear 22a and so that the upper half of the chopper 50 is located above the guide plate 28.

Figure 4C:
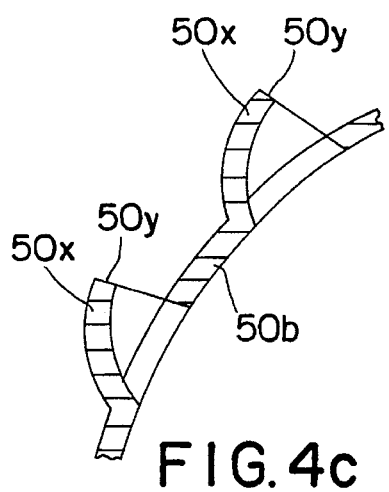

The looped body 50b is provided with a plurality of cutting means 50x as shown in FIG. 4c, which are outwardly projected bumps. The bumps are arranged so that they are on imaginary lines which are not parallel to or inclined relative to the axis of the looped body 50b as shown in FIG. 4a. Each bump is formed so that a part of the looped body 50b, which is made of a metal, is cut in a semicircular shape, and a resulting semicircular portion is pressed outwardly. Thus, the resulting edge portion 50y of the bump or cutting means 50x forms the cutting edge.

With these cutting means 50x, the rotary chopper 50, when rotated, can chop the hard foodstuff into minute pieces so that the chopped pieces may drop onto the guide plate 28 and then slide onto the meshed and rotating helical gears 22a and 22b.

The compression chamber 40 is provided under the grinding chamber 20 and is comprised of a covering body 60 which forms a top half of the compression chamber 40 and a mesh frame assembly 70 which forms a bottom half of the compression chamber 40, and a pair of spiral screws 80 are installed in the compression chamber 40.

Figure 5:
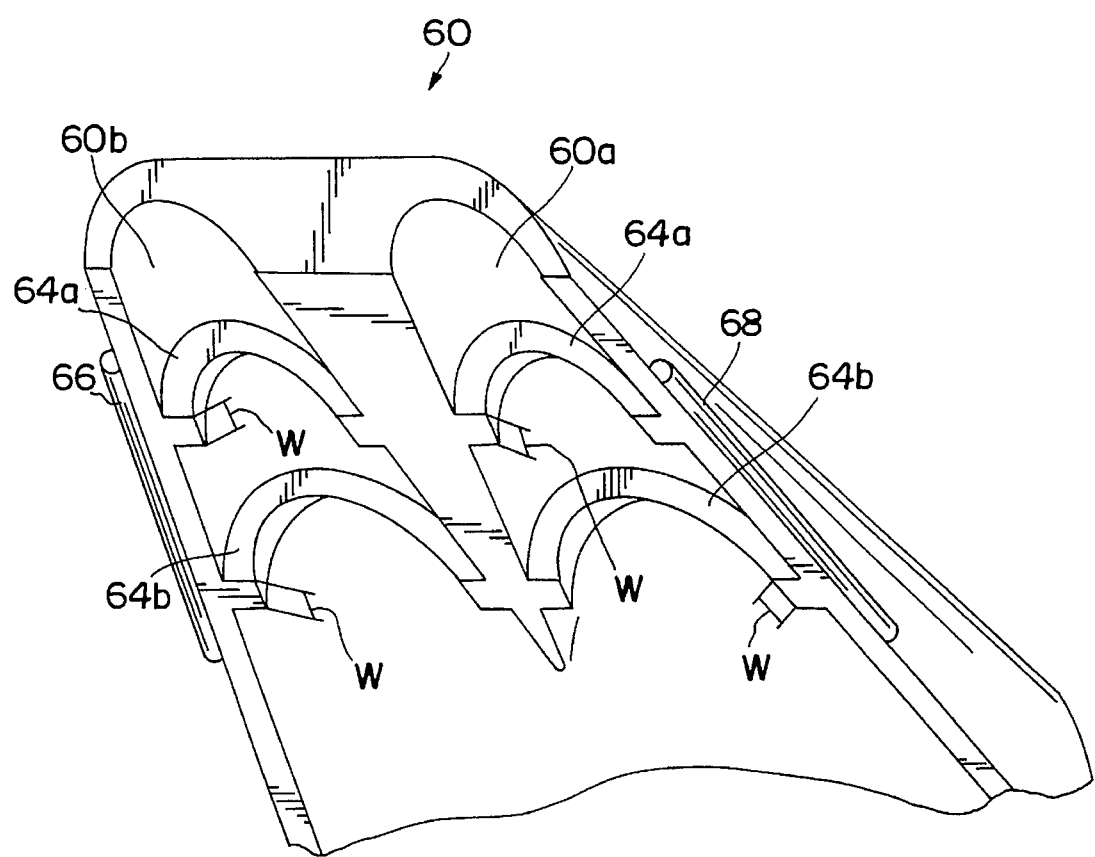
FIG. 5 shows the upper inside of the compression chamber of the juice extractor.

More specifically, the covering body 60 of the compression chamber 40 is, as shown in FIG. 5, provided with two semicircular passages 60a and 60b which are of tapered shape so as to accommodate the upper half of the two substantially tapered shape spiral screws 80 therein, and each one of the passages 60a and 60b is provided with a plurality of semicircular arch-shaped ribs 64a and 64b formed on the upper inner surface thereof.

Figure 6:
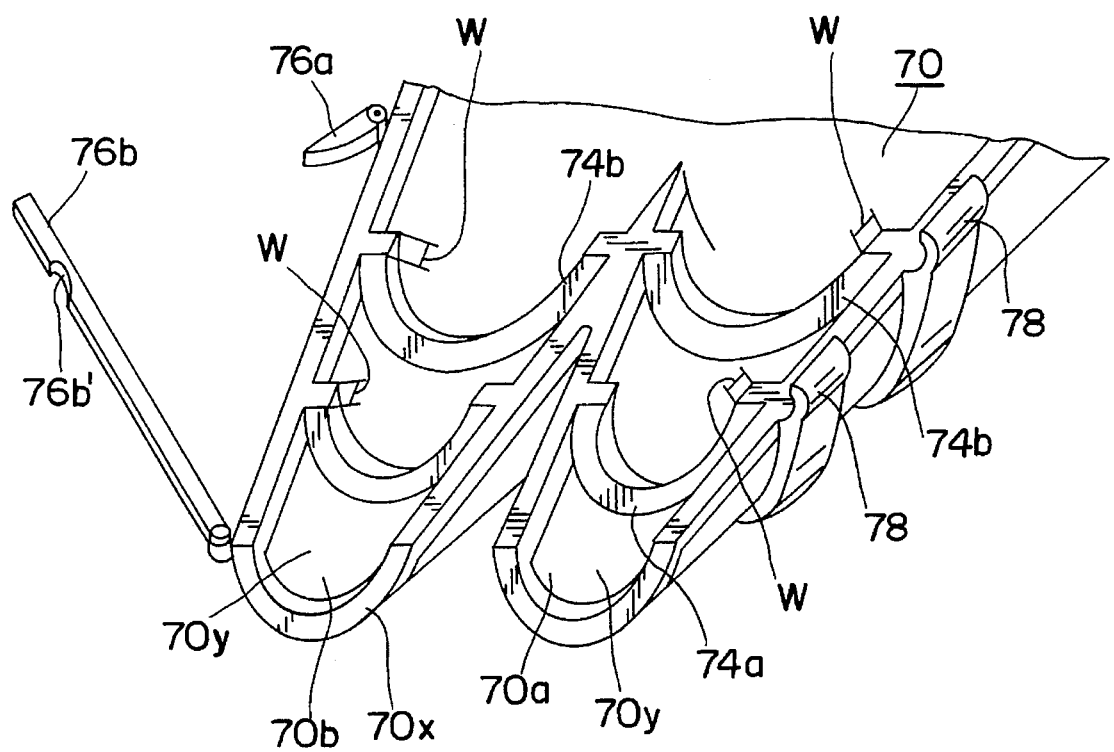
FIG. 6 shows a mesh frame assembly used in the juice extractor with the locking device opened.

The bottom of the covering body 60 is opened as shown in FIG. 5 and is covered by a removable mesh frame assembly 70, which makes a juice outlet. FIG. 6 shows an overall view of the mesh frame assembly 70. The mesh frame assembly 70 is comprised of a frame body 70x and a fine mesh screen 70y which is extended inside the frame body 70x so as to form the bottom of the mesh frame assembly 70. The mesh frame assembly 70 is provided with two semicircular passages 70a and 70b so as to positionally correspond to the two passages 60a and 60b of the covering body 60.

Figure 8:
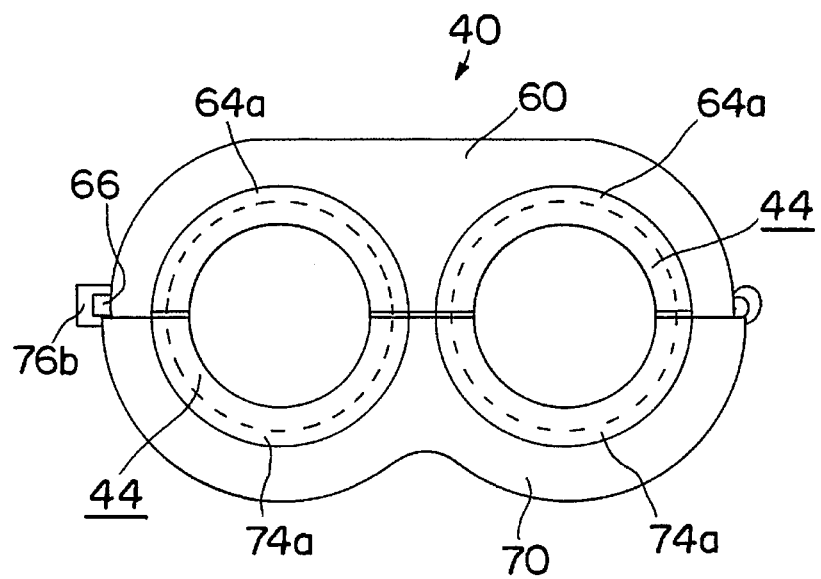
FIG. 8 is a side view of the compression chamber, particularly showing the positional relationship of the compression chamber, squeezing ribs, and spiral screws.

Each of the two passages 70a and 70b is provided with a plurality of semicircular arch-shaped squeezing ribs; in other words, two semicircular ribs are provided in each passage, which are a first rib 74a and a second rib 74b. These ribs 74a and 74b are substantially the same shape as the squeezing ribs 64a and 64b formed in the covering body 60 so that when the mesh frame assembly 70 is attached to the covering body 60 from underneath to form the compression chamber 40, the semicircular squeezing ribs 74a and 74b of the mesh frame assembly 70 and the semicircular squeezing ribs 64a and 64b of the compression chamber 60 form annular squeezing ribs 44 as shown in FIG. 8.

Figure 7:
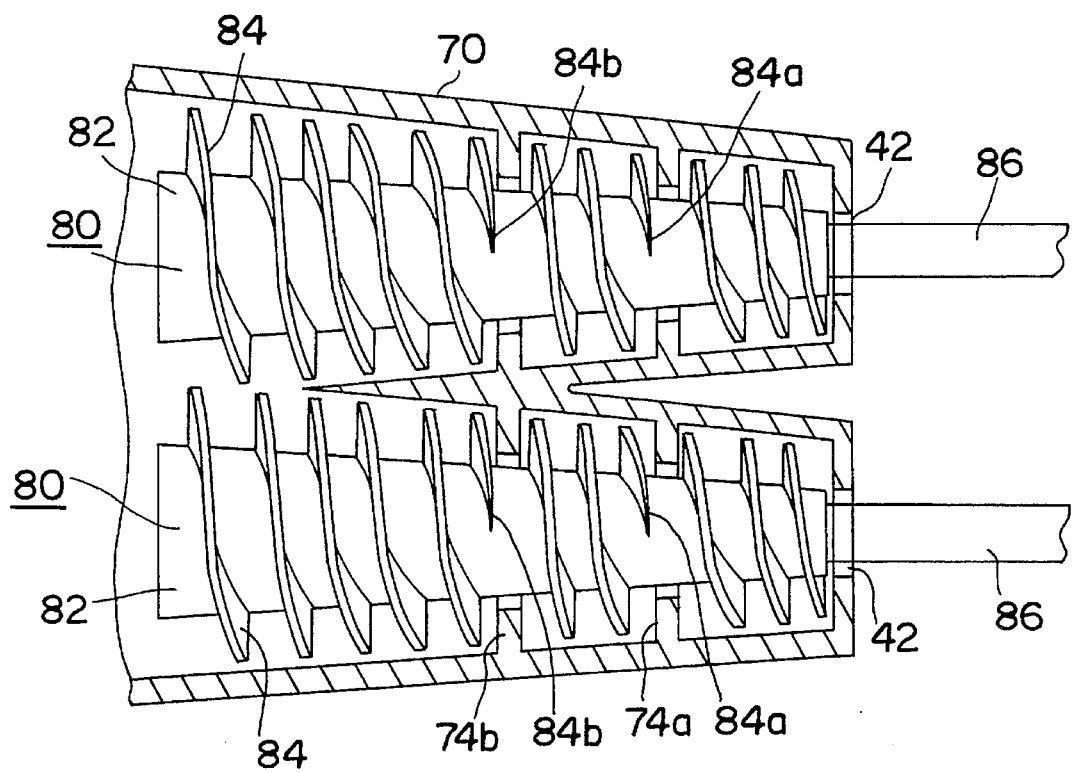
FIG. 7 shows spiral screws inside the mesh frame assembly, particularly showing the positional relationship between the ridges of the screws and squeezing ribs of the mesh frame assembly.

Furthermore, each of the spiral screws 80 provided in the thus composed compression chamber 40 is, as shown in FIG. 7, comprised of a main shaft 82 and a continuous spiral ridge 84 which is provided from one end to another of the main shaft 82. Each of these screws 80 is substantially of a tapered shape as seen from FIG. 7 so that they are snugly set inside the taper-shaped passages formed by the passages 60a and 70a of the covering body 60 and mesh frame assembly 70, respectively. The spiral screws 80 are meshed with each other at one end and rotated by the transmission shafts 86 which are connected to the driving motor 12. Thus, the spiral screws 80 transfer the foodstuff or residue in direction A which is opposite to the direction B made by the helical gears 22 of the grinding chamber 20.

In addition, each of the spiral screws 80 disposed inside the circular passages as described above is formed with a plurality of cut-outs which extend circumferentially on each one of the main shafts 82 of the spiral screws 80. In the embodiment, each screw 80 has two cut-outs, a first cut-out 84a and a second cut-out 84b. Thus, the spiral ridge 64 formed on each of the screws 80 is discontinuous at these cut-outs 84a and 84b between both ends of each screw. The width in the axial direction of each one of the cut-outs 64a and 64b is slightly larger than the width W of each one of the semicircular squeezing ribs 64a, 64b, 74a and 74b of the covering body 60 and of the mesh frame assembly 70 so that the first ribs 64a and 74a are positioned inside the first cut-outs 84a, and the second ribs 64b and 74b are positioned inside the second cut-outs 84b, respectively.

In other words, the cut-outs 84a formed on the spiral screws 80 are, while rotating, engageable with the squeezing ribs formed on the inner surfaces of the covering body 60 and in the mesh frame assembly 70. Thus, the residues of the foodstuffs supplied from the grinding chamber 20 are pressed against the squeezing ribs 64a, 64b, 70a and 70b by the curved surfaces of the spiral ridges 84 of the spiral screws 80.

In addition, the forward ends of the spiral ridges 84 of the spiral screws 80 are in contact with the inside end surfaces of the compression chamber 40 so that the residue is further pressed against these inside end surfaces by the ridges 84 of the spiral screws 80.

At the forward end of the compression chamber 40 is provided with circular openings 42, and the end portions of screw drive shafts 86 are inserted therein so as to be connected to the spiral screws 80. The other end of the screw drive shafts 86 are connected to the driving motor 12 via the transmission gears 14. The diameter of the screw drive shafts 86 are slightly smaller than the diameter of the circular opening 42. Accordingly, annular gaps are formed between the outer surfaces of the screw drive shafts 86 and the inner surfaces of the circular openings 42, and such annular gaps are used as residue outlets. In other words, the residue from which juice has been extracted is forced out of the compression chamber 40 through the circular openings 42.

Figure 9:
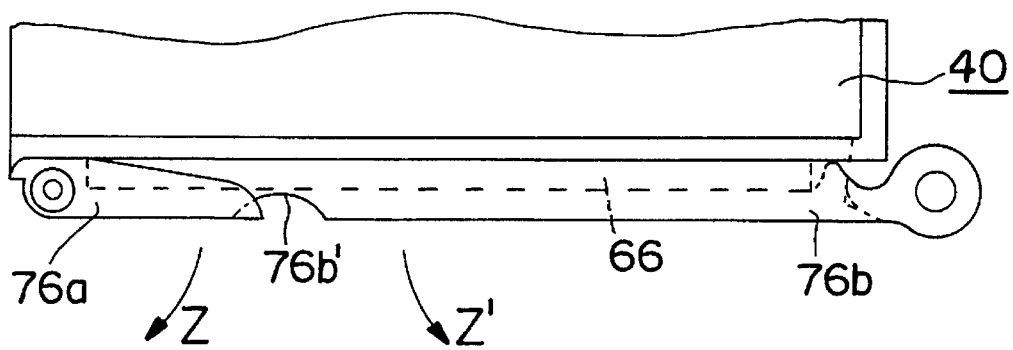
FIG. 9 is a top view of the locking device of the mesh frame assembly, the locking device being in a locked position.

As described above, the bottom half of the compression chamber 40 is covered by the mesh frame assembly 70 which acts as a juice outlet. In particular, the mesh frame assembly 70 is mounted to the underside of the covering body 60 via the locking device 76 and hooks 78 of the mess frame assembly 70 and via the mesh mounts 66 and 68 of the covering body 60. More specifically, the frame body 70x of the mesh frame assembly 70 is provided, on its one side, with the locking device 76 and, on its another side with the hooks 78 that project outwardly and upwardly as seen in FIG. 6. The locking device 76 comprises a locking piece 76a and covering piece 76b which are pivotally disposed on the frame body 70x. The locking piece 78a and the covering piece 76b are of channel-shape, and the locking piece 78a can stay at two positions by a coil spring (not shown) provided inside thereof. When the locking piece 78a is at a locked position as shown in FIG. 9, it keeps the covering piece 76b at the closed position. On the other hand, the covering body 60 is provided with the mesh mounts 68 on the outer surface so that the mesh mounts 68 extend parallel to the axes of the passages 60a and 60b.

When the mesh frame assembly 70 is mounted to the covering body 60 to form the compression chamber 40, the hooks 78 are engaged with the mesh mount 68, the mesh frame assembly 70 is rotated about the mesh mount 78 so that the covering piece 76b is engaged with the mesh mount 66, and then the locking piece 76a is brought to the closed location as shown in FIG. 9 overcoming the spring force of the coil spring provided inside the locking piece 76a, thus snap-fitted over the covering piece 76b. When the mesh frame assembly 70 is removed from the covering body 60, the locking piece 76a is turned in the direction of arrow Z, and the covering piece 76 is turned in the direction of arrow Z'. The covering piece 76b is provided with a finger guide 76b' for facilitating the turning of the locking piece 76a.

With the structure described above, the juice material is inserted into the hopper 30 after turning on the switch (not shown) of the juice extractor 10. Hard foodstuff is inserted into the first passage 30a and other foodstuffs which are not hard are inserted into the second passage 30b.

The foodstuff inserted into the first passage 30a is chopped by the cutting edges 50x of the rotary chopper 50 which is rotated by the driving motor 12.

The chopped foodstuff is dropped onto the inclined guide plate 28 so that they are, along with the foodstuff inserted into the second passage 30b, crushed and ground by the meshing helical gears 22 that are rotated by the driving motor 12. By these helical gears 22, the foodstuffs are crushed between the threads of the helical gears 22 so that juice is extracted. The thus obtained juice and the residue produced from the foodstuff are forwarded by the rotating helical gears 22 in the direction B to the forward end of the grinding chamber 20 by the spirals 28 provided at the forward end of the helical gears 22. At the forward end, the residue is pressed by the threads of the spirals 26 against the squeezing plates 27 so that juice is further extracted from the residue.

The residue and juice are then transferred into the compression chamber 40 through the transfer passage 29 and moved in the direction A by the meshing and rotating spiral screws 80. When the residue is thus moved, it is pressed by the spiral ridges 84 of the rotating spiral screws 80 against the annular squeezing ribs 44 which are formed by the semicircular ribs 64a and 64b of the covering body 60 and the semicircular ribs 74a and 74b of the mesh frame assembly 70. In other words, the residue is pressed by the curved surface of the spiral ridge 84 of the spiral screws 80 against flat side surfaces of the squeezing ribs 44 and rubbed and squeezed by them. Thus, juice is further extracted from the residue.

After being pressed by the curved surface of the spiral ridges 84, the residue is forced over the squeezing ribs 44 by the spiral ridges 84 of the rotating screws 80 and transferred forward in the direction A.

Since in this embodiment, two squeezing ribs 44 are formed by the semicircular ribs 64a and 74a and by the semicircular ribs 64b and 74b, the residue is pressed against the squeezing ribs 44 twice by the spiral ridges 84 before it is forwarded to the terminal ends of the spiral screws 80. Thus, substantially all of the liquid substance contained in the foodstuff is extracted in the form of juice.

The residue which has been forced to pass over the two annular ribs is further pressed by the end surface of the compression chamber 40 by the forward end surface of the spiral ridges 84 of the spiral screws 80, thus performing a final juice extraction process.

The juice extracted from the material by the helical gears 22 of the grinding chamber 20 is forwarded to the compression chamber 40 via the passage 29 and flows out of the compression chamber 40 through the mesh 70y of the mesh frame assembly 70 along together with the juice extracted from the residue by the spiral screws 80 and squeezing ribs 44 of the compression chamber 40.

One test indicates that about 70% of the liquid element in the material is squeezed out before the material is forwarded to the squeezing rib 44 that is formed by the semicircular ribs 64b and 74b, approximately 20% of the liquid substance in the material or in the residue is extracted at the squeezing rib 44 which is formed by the semicircular ribs 64a and 74a, and approximately 10% of the liquid substance is extracted at the end of the compression chamber 40. Thus, it is possible to extract all of the liquid contained in the material.

Figure 10:
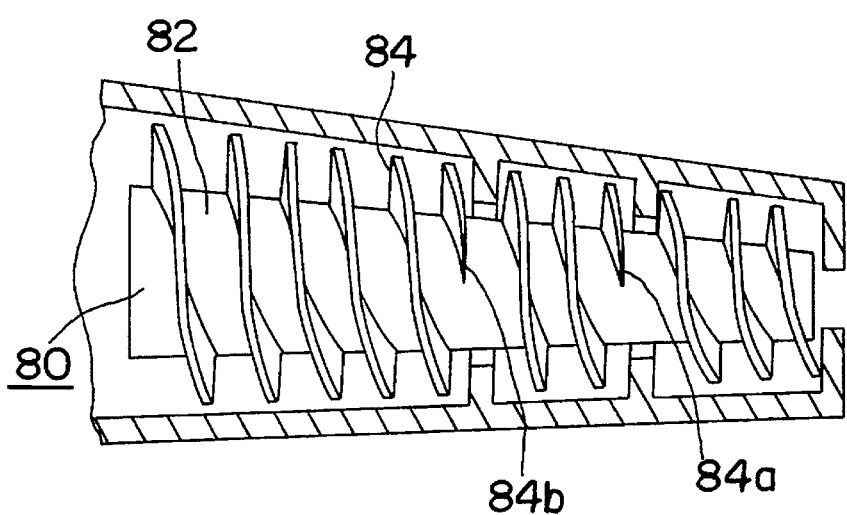
FIG. 10 shows a single spiral screw disposed inside the compression chamber.
Figure 11:
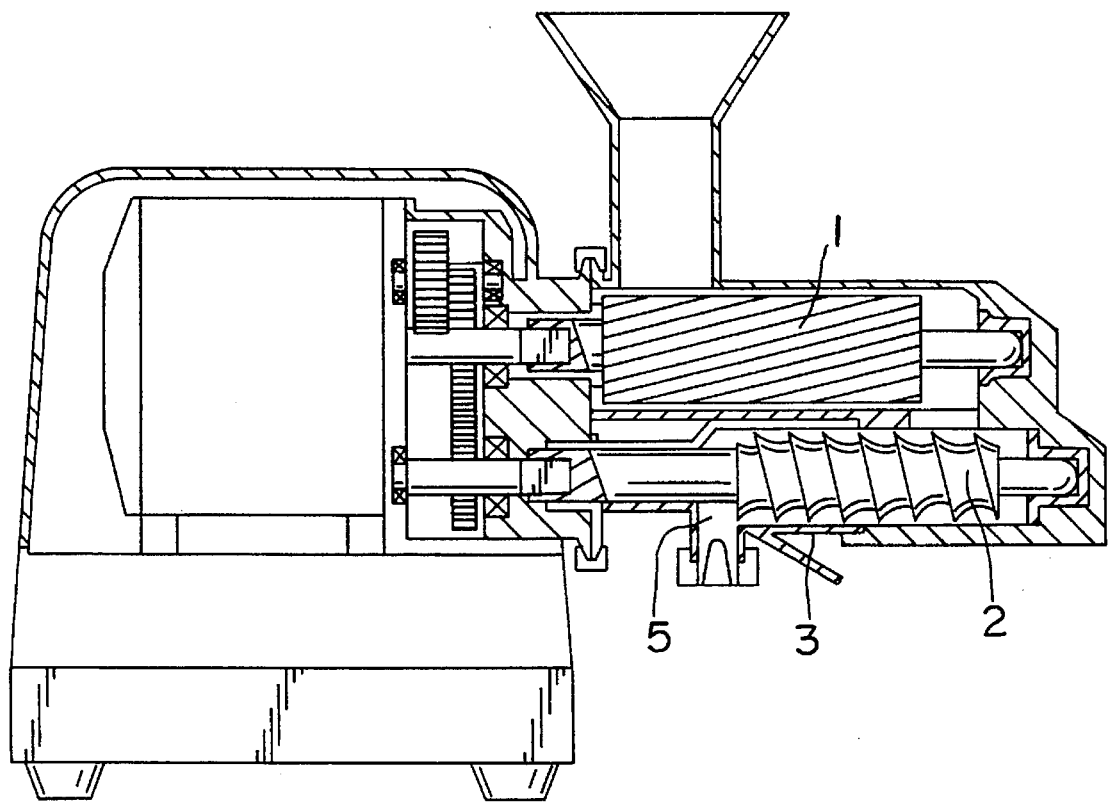
FIG. 11 shows a prior art juice extractor.

Though a pair of spiral screws 80 are used in the above embodiment, a single spiral screw 80 which is provided with a plurality of cut-outs 64a and 64b as shown in FIG. 10 can be employed. In addition, the annular squeezing ribs 44 can be more than two by forming more than two semicircular ribs on the covering body 60 and on the mesh frame assembly 70. In this case, the number of the cut-outs formed on the spiral screw(s) must match the number of the annular ribs so as to mesh with those annular ribs.

As seen from the above, according to the present invention, the foodstuff is squeezed by the meshing and rotating helical gears and pressed against the squeezing plates of the squeezing chamber and further against the annular ribs and the end surface of the compression chamber. Therefore, any liquid in the foodstuff can be extracted in the form of a clear juice.

I claim:

1. A juice extractor comprising a grinding chamber which is provided therein with a pair of helical gears for grinding material and a compression chamber which communicates at one end thereof with one end of said grinding chamber and is provided therein with a spiral screw which is provided on an outer circumference thereof with a spiral ridge, wherein said compression chamber is provided with an annular rib on an inner surface thereof and said spiral screw is provided with a cut-out in said spiral ridge so that said cut-out of said spiral ridge engages with said annular rib of said compression chamber.

2. A juice extractor according to claim 1, wherein said compression chamber is made up of a covering body and a mesh frame assembly, said covering body being provided therein with a semicircular rib and said mesh frame assembly being provided therein with a semicircular rib so that said semicircular rib of said covering body and said semicircular rib of said mesh frame assembly form said annular rib of said compression chamber.

3. A juice extractor comprising:
 a driving motor;
 a grinding chamber provided therein with a pair of helical gears, said helical gears being disposed side-by-side so as to be meshed with each other and rotated by said driving motor so as to crush material in between, which is inserted through a hopper provided at one end of said grinding chamber, and forwards said material from one end to another of said grinding chamber;

a hopper provided at said one end of said grinding chamber so that said material is brought thereinto;

a compression chamber which communicates at one end thereof with said another end of said grinding chamber so that said material is transferred from said grinding chamber into said compression chamber, said compression chamber being provided with a plurality of annular ribs on an inner surface thereof; and a pair of spiral screws which are disposed in said compression chamber and rotated by said driving motor, each one of said pair of spiral screws being provided on an outer surface of a main shaft thereof with a spiral ridge which is formed with a plurality of cut-outs so that said cut-outs extends circumferentially on said main shaft of said spiral and engages with said plurality of annular ribs of said compression chamber.

4. A juice extractor according to claim 3, further comprising a rotary chopper provided at one end of said grinding chamber and beneath a bottom of said hopper so as to be rotated by said driving motor.

5. A juice extractor according to claim 4, wherein said rotary chopper is a cylindrical body disposed so that an axis of said chopper is parallel to axes of said helical gears, said chopper being provided with a plurality of outwardly projected bumps which have cutting edges.

6. A juice extractor according to claim 4, wherein an inside of said hopper is divided into two material passages so that one of said two material passages is located above said rotary chopper.

7. A juice extractor according to claim 6, wherein one of said two material passages of said hopper is provided at a bottom thereof with an inclined guide plate which is located inside said cylindrical body of said rotary chopper.

8. A juice extractor according to claim 3, wherein said grinding chamber is further provided with squeezing plates which are formed inside said another end of said grinding chamber so as to be located between said helical gears which are disposed side-by-side.

9. A juice extractor according to claim 3, wherein said compression chamber is provided with a juice outlet formed in a bottom of said compression chamber, said juice outlet being formed by a mesh frame which is detachable from said compression chamber.

10. A juice extractor according to claim 3, wherein said compression chamber is made up of a covering body and a mesh frame assembly, said covering body being provided therein with a plurality of semicircular ribs and said mesh frame assembly being provided therein with a plurality of semicircular ribs so that said semicircular ribs of said covering body and said semicircular rib of said mesh frame assembly form said annular ribs of said compression chamber.

11. A juice extractor according to claim 10, wherein said mesh frame assembly is removably mounted to said covering body.

12. A juice extractor according to claim 10, wherein said covering body is provided with mesh mounts and said mesh frame assembly is provided with a locking device and hook means which are detachably engaged with said mesh mounts of said covering body.

13. A juice extractor according to claim 3, wherein one of said pair of spiral screws disposed in said compression chamber is movable to and away from another of said pair of spiral screws.

* * * * *